G. A. GOEKEMEYER.
AUTOMOBILE FENDER.
APPLICATION FILED APR. 18, 1911.
1,203,324.
Patented Oct. 31, 1916.
3 SHEETS—SHEET 1.
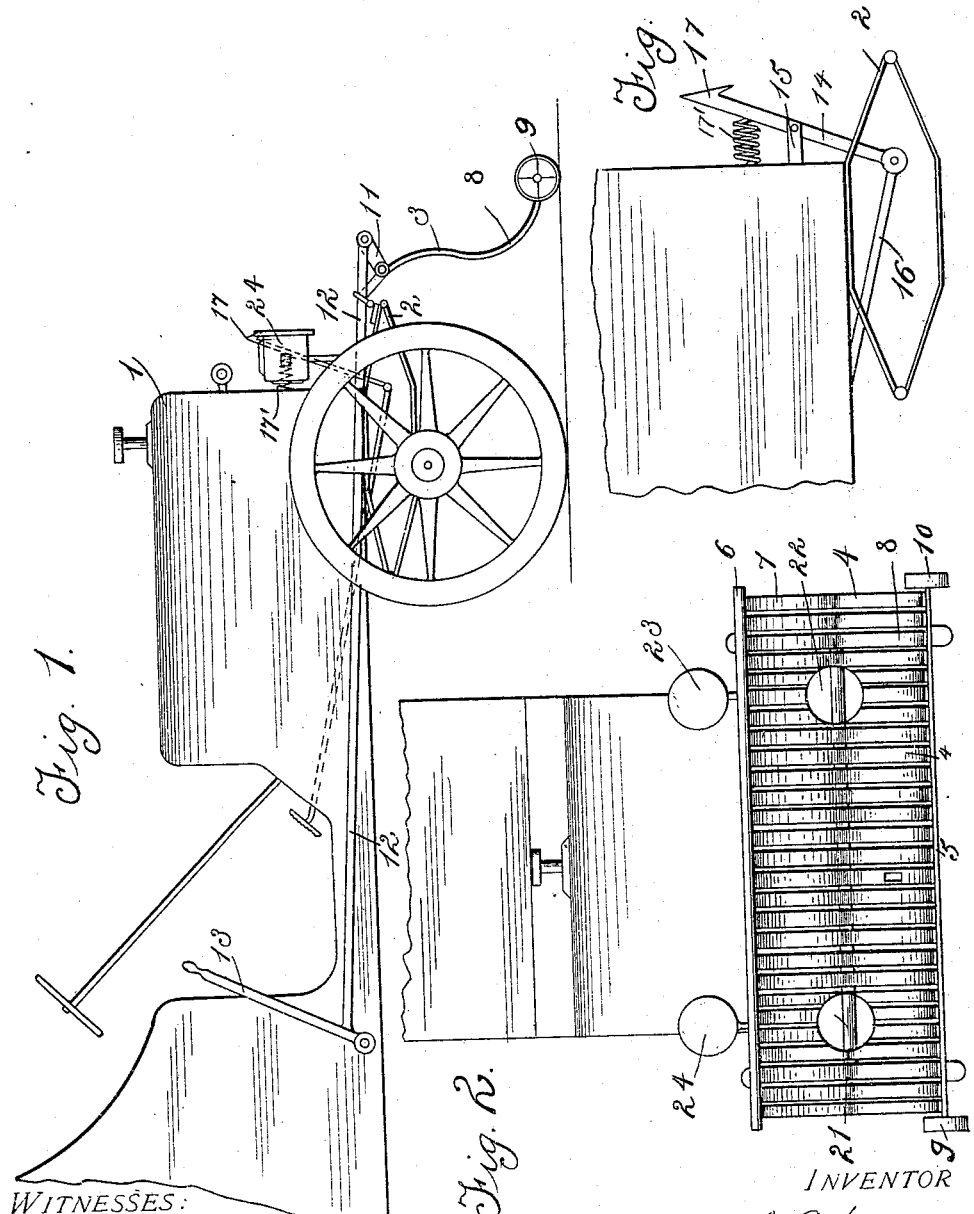
WITNESSES:
INVENTOR
Gustav A. Goekemeyer
BY
Attorney G. A. GOEKEMEYER.
AUTOMOBILE FENDER.
APPLICATION FILED APR. 18, 1911.
1,203,324.
Patented Oct. 31, 1916.
3 SHEETS—SHEET 2.
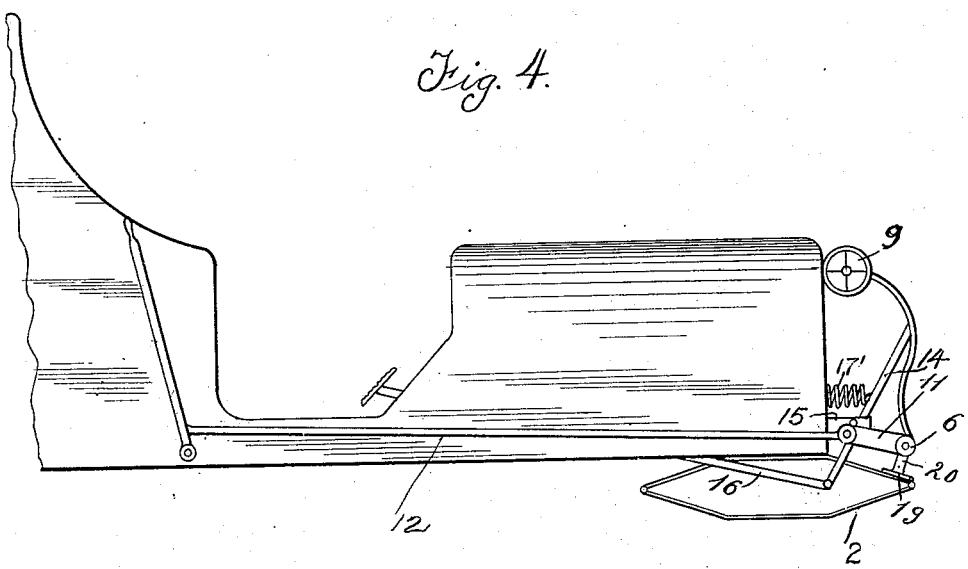
Fig. 4.
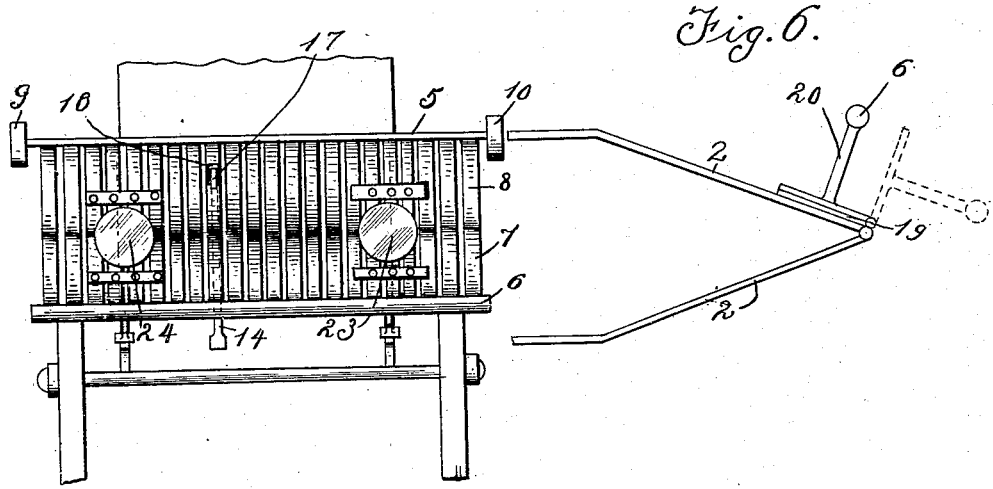
Fig. 5.
Fig. 6.
WITNESSES:
INVENTOR
Gustav A. Goekemeyer
BY
Attorney

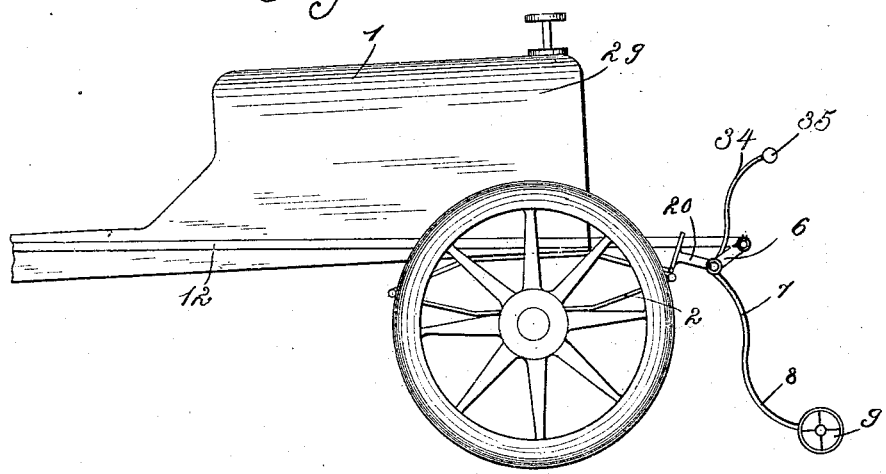

UNITED STATES PATENT OFFICE.

GUSTAV A. GOEKEMEYER, OF CINCINNATI, OHIO.

AUTOMOBILE-FENDER.

1,203,324.  Specification of Letters Patent.  Patented Oct. 31, 1916.

Application filed April 18, 1911. Serial No. 621,895.

*To all whom it may concern:*

Be it known that I, GUSTAV A. GOEKEMEYER, citizen of the United States, residing at Cincinnati, in the county of Hamilton and State of Ohio, have invented certain new and useful Improvements in Automobile-Fenders, of which the following is a specification.

This invention relates to improvements in fenders for automobiles and has for its object to provide a fender which may be instantly thrown into tripped and dropped position.

Another object is to provide an automobile fender so arranged as not to interfere with the headlights of the machine.

With the above and other objects in view I have invented the device illustrated in the accompanying drawings in which, Figure 1 is a side elevation of an automobile showing my improved fender thereon, Fig. 2 is a front view thereof, Fig. 3 is a detail of a releasing device, Fig. 4 is a view somewhat similar to Fig. 1 showing the fender in a raised position, Fig. 5 is a view similar to Fig. 2 showing the fender raised, Fig. 6 is a detail view of a hinge member mounted on a spring, Fig. 7 is a similar view showing still another modification.

Referring to the accompanying drawings 1 is an automobile to the front springs 2 of which is hinged a fender 3 consisting of a series of band springs 4 the ends of which are secured to a pair of parallel rods 5 and 6. The upper part 7 of these springs are bent outwardly so that they will bend inwardly under the impact of any body and the lower part 8 of the springs are curved in the form of a scoop for catching any body that may strike them. The rod 5 is mounted on rollers 9 and 10 which hold the fender from direct contact with the ground. A crank 11 is secured to the rod 6, to which is secured a shifting rod 12 which is attached to a lever 13 by means of which the fender may be thrown into or out of use. A latch lever 14 is pivoted to a bracket 15 on the machine and a rod 16 is pivoted thereto by means of which the latch 17 may be caused to engage the opening 18 in the fender, said latch 17 being normally controlled by a spring 17' in order to hold said fender in its upraised position shown clearly in Fig. 4, where it will be seen that the rollers 9 may engage the bonnet 29 of the automobile. Hinges 19 having arms 20 secured to the rod 6 are fastened to the springs 2, whereby the fender is secured to the machine 1.

Openings 21 and 22 are provided in the fender through which the rays of the headlights 23 and 24 may project when the fender is raised.

In Fig. 7 another modification is shown in which a series of bands 34 are secured to the rod 6, thus increasing the height of the fender. A rod 35 is secured to the upper ends of these bands.

From the above it will be obvious that I have devised a fender which is a substantially resilient body mounted on a resilient support, said fender being movable to opposite positions in a vertical plane to occupy either an upraised or lowered position. In conjunction with said fender there is provided hand-controlled means for actuating the means for moving said fender to either of its last named positions, a latching member for holding said fender in its upraised position, and foot-pressed means for releasing said latching member. By virtue of said arrangement the automobile fender, shown in the drawings, can be very readily mounted in an upraised or lowered position by the driver without making it necessary for him to leave the car.

Numerous modifications may be resorted to in practice without departing in principle from the details herein disclosed.

I claim and desire to secure by Letters Patent:—

1. In combination with a vehicle having springs, a latticed fender pivoted to said springs in a way to rest entirely above the springs when in a raised position, and depend entirely below said springs when in a lowered position, and wheels mounted upon the free corners of said fender, said vehicle having a hood against which said wheels are adapted to abut when said fender is in a raised position.

2. In combination with a vehicle having springs, a latticed fender pivoted to said springs in a way to rest entirely above the springs when in a raised position, and depend entirely below said springs when in a lowered position, wheels mounted upon the free corners of said fender, said vehicle having a hood against which said wheels are adapted to abut when said fender is in a raised position, and said wheels being adapted to run on the ground when said fender is lowered.

3. In combination with a vehicle having springs, a latticed fender pivoted to said springs in a way to rest entirely above the springs when in a raised position, and depend entirely below said springs when in a lowered position, wheels mounted upon the free corners of said fender, said vehicle having a hood against which said wheels are adapted to abut when said fender is in a raised position, said wheels being adapted to run on the ground when said fender is lowered, and means for throwing said fender into a raised position.

4. In combination with a vehicle having springs, a latticed fender pivoted to said springs in a way to rest entirely above the springs when in a raised position, and depend entirely below said springs when in a lowered position, wheels mounted upon the free corners of said fender, said vehicle having a hood against which said wheels are adapted to abut when said fender is in a raised position, said wheels being adapted to run on the ground when said fender is lowered, means for throwing said fender into a raised position, and means for releasing said fender from a raised position, whereby it may swing to a lowered position.

5. In combination with a vehicle having springs, a latticed fender pivoted to said springs in a way to rest entirely above the springs when in a raised position, and depend entirely below said springs when in a lowered position, wheels mounted upon the free corners of said fender, said vehicle having a hood against which said wheels are adapted to abut when said fender is in a raised position, said wheels being adapted to run on the ground when said fender is lowered, and means for throwing said fender into a raised position, means for releasing said fender from a raised position, whereby it may swing to a lowered position, and an extension formed on said fender adapted to project said springs when said fender is in a lowered position.

6. In combination with a vehicle having springs, a latticed fender pivoted to said springs in a way to rest entirely above the springs when in a raised position, and depend entirely below said springs when in a lowered position, wheels mounted upon the free corners of said fender, said vehicle having a hood against which said wheels are adapted to abut when said fender is in a raised position, said wheels being adapted to run on the ground when said fender is lowered, means for throwing said fender into a raised position, means for releasing said fender from a raised position, whereby it may swing to a lowered position, and an extension formed on said fender adapted to project said springs when said fender is in a lowered position, said fender being formed with a series of resilient slats.

7. In combination with a vehicle having springs, a latticed fender pivoted to said springs in a way to rest entirely above the springs when in a raised position, and depend entirely below said springs when in a lowered position, wheels mounted upon the free corners of said fender, said vehicle having a hood against which said wheels are adapted to abut when said fender is in a raised position, said wheels being adapted to run on the ground when said fender is lowered, means for throwing said fender into a raised position, means for releasing said fender from a raised position, whereby it may swing to a lowered position, and an extension formed on said fender adapted to project said springs when said fender is in a lowered position, said fender being formed with a series of resilient slats, certain of which are provided with cut away portions so as not to obstruct light rays.

8. In combination with a vehicle having springs, a latticed fender pivoted to said springs in a way to rest entirely above the springs when in a raised position, and depend entirely below said springs when in a lowered position, wheels mounted upon the free corners of said fender, said vehicle having a hood against which said wheels are adapted to abut when said fender is in a raised position, said wheels being adapted to run on the ground when said fender is lowered, means for throwing said fender into a raised position, and means for releasing said fender from a raised position, whereby it may swing to a lowered position, and a rod upon which one end of said slats are mounted, said rod having a crank lever connected to said first means.

In testimony whereof I affix my signature in presence of two witnesses.

GUSTAV A. GOEKEMEYER.

Witnesses:
JOSEPH B. SCHROEDER,
WILLIAM E. VOGT.

Copies of this patent may be obtained for five cents each, by addressing the "Commissioner of Patents, Washington, D. C."